United States Patent [19]

Riley

[11] Patent Number: 5,063,703

[45] Date of Patent: Nov. 12, 1991

[54] ARTIFICIAL FISH BAIT

[76] Inventor: Patrick F. Riley, 926 Cherokee Trail, Willoughby, Ohio 44094

[21] Appl. No.: 540,676

[22] Filed: Jun. 15, 1990

[51] Int. Cl.[5] ............ A01K 85/00

[52] U.S. Cl. ............ 43/42.06; 43/42.53

[58] Field of Search ............ 43/42.53, 42.06, 17.6, 43/42

[56] References Cited

U.S. PATENT DOCUMENTS

| | | | |
|---|---|---|---|
| 2,979,778 | 4/1961 | Simons | 43/42.06 |
| 3,322,544 | 5/1967 | Yakstis | 43/42.53 |
| 3,410,689 | 11/1968 | Nathan | 43/42.06 |
| 3,528,816 | 9/1970 | Nagae | 43/42.53 |
| 3,579,895 | 5/1971 | Orn | 43/42.06 |
| 3,971,152 | 7/1976 | Husson | 43/42.06 |
| 4,741,120 | 5/1988 | Cota et al. | 43/42.33 |
| 4,803,793 | 2/1989 | Schellenberg | 43/42.33 |

*Primary Examiner*—Kurt Rowan
*Assistant Examiner*—Chuck Y. Mah
*Attorney, Agent, or Firm*—Pearne, Gordon, McCoy & Granger

[57] ABSTRACT

An artificial fish bait formed of a natural blend of freeze-dried natural food normally providing a food source for the fish, fish oil, and a nontoxic phosphorescent material which emits light after exposure to light. The phosphorescent material emits light to attract fish and the fish oil and natural blend provide a scent to attract fish.

9 Claims, 1 Drawing Sheet

ARTIFICIAL FISH BAIT

BACKGROUND OF THE INVENTION

This invention relates generally to fish bait, and more particularly to a novel and improved artificial fish bait.

Prior Art

Plastic molded fish bait in various shapes are known. For example, molded plastic worms and crayfish have been used as fish bait. However, such artificial bait normally does not emit the odor of natural fish food sources to attract the fish. Further, such bait does not normally emit light.

It is also known to provide light sticks which contain chemicals that, when brought into contact, emit light for a period of time. Such light sticks can only be used once, and must then be discarded.

SUMMARY OF THE INVENTION

The invention provides a novel and improved artificial fish bait which incorporates a blend of natural foods on which the fish normally feed. This blend of natural foods is distributed in a soft plastic body molded into the shape of a bait fish, such as a sardine. The plastic is sufficiently porous to permit the odor of the natural food to pass out into the water, where it functions to attract fish. Further, in the illustrated embodiment, the plastic of the body is combined with a light-emitting phosphorescent material which, after exposure to a light source such as the sun or a bright latern light, continues to emit a soft light that attracts fish in dark water, even at night. Further, the body material is impregnated with a fish oil which leaches out into the water to further attract the fish.

Still further in the illustrated embodiment, the blend of natural food is first freeze-dried to greatly concentrate the food material and greatly reduce its volume. The blend of freeze-dried material is introduced into the plastic base material in the form of small granules which are dispersed throughout the body of plastic. In such form, the ordor from the material blend continues indefinitely, making the bait usable over extended periods of time.

These and other aspects of this invention are illustrated in the accompanying drawings, and are more fully described in the following specification.

DETAILED DESCRIPTION OF THE INVENTION

Figure 1:
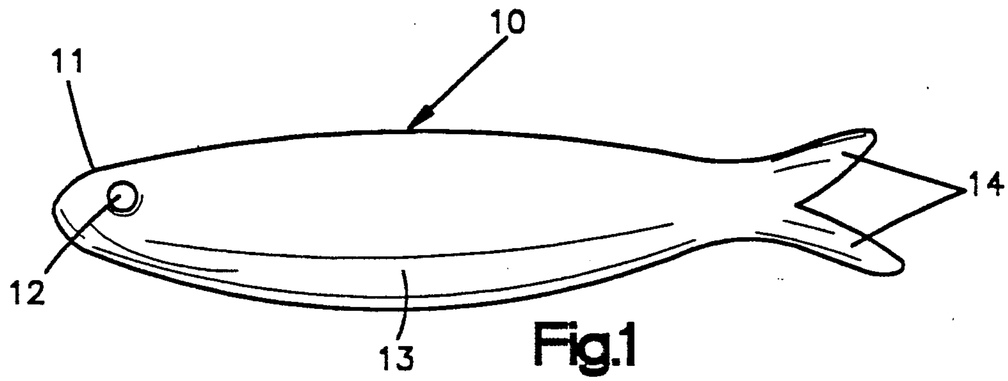
FIG. 1 is a side elevation of an artificial bait in accordance with this invention, molded in the form of a sardine.
Figure 2:
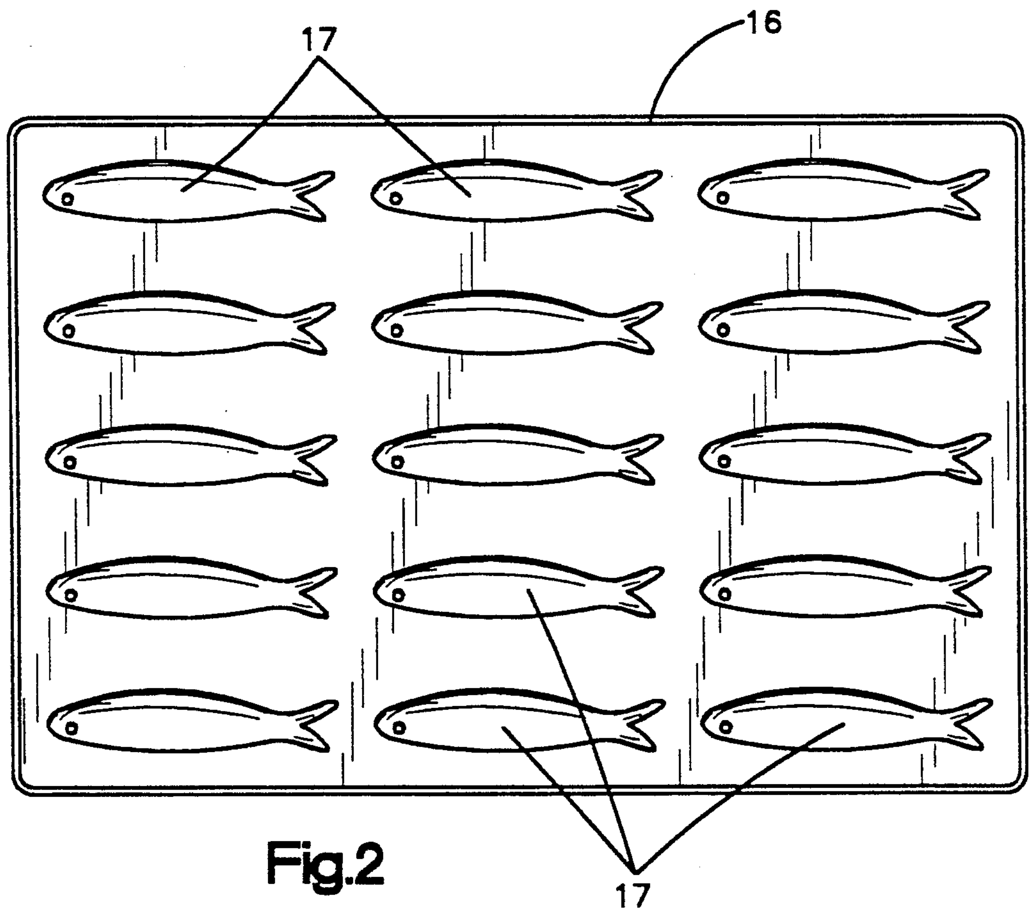
FIG. 2 is a plan view of a multiple cavity mold for molding the artificial bait of FIG. 1.

The particular fish bait 10 illustrated in FIG. 1 is molded in the shape of a sardine. The fish bait 10 provides a head portion 11 having a projecting eye 12, and a main body portion 13 which tapers with reduced height back to a forked tail 14. Preferably, the bait itself is molded in a multiple cavity mold 16 formed as described below. Such mold is in the form of a panel or sheet having a plurality of cavities 17 so that a plurality of individual baits can be formed simultaneously in a single pour. In the illustrated mold of FIG. 2, there are 15 cavities; however, molds of a greater or lesser number of cavities can also be provided.

The illustrated mold 16 is produced as follows. A mix of plaster of Paris is poured into a relatively large, shallow pan or tray. While the mixture is still soft, actual bait fish such as Spanish sardines are pressed into the soft plaster of Paris mix to make the impressions. When the mold dries hard, the bait fish are removed and the cavities are engraved to provide the detail of the bait fish in the mold.

Thereafter, if additional molds are required, they can be produced by covering the initial mold with melted glue sticks or the like, which are removed after hardening to provide a positive image of the cavities contained in the original mold. The positive image is then used to produce additional molds from a suitable plaster of Paris or lab stone material. It is also within the scope of this invention to use a plastic injection molding machine for the production of the individual bait fish. After the mold is prepared, the bait fish are cast within the individual cavities 17.

One of the important constituents of the material forming the bait fish is a blend of natural food upon which the fish normally feed. This blend of material (hereinafter referred to as the "natural blend"), in the illustrated embodiment, is in the form of a freeze-dried material prepared as follows.

Preferably, the natural blend is prepared in batches, with the typical batch consisting of:

| | | Percentage By Weight |
|---|---|---|
| Mullet and/or pin fish | 50 lbs. | 46% |
| Sardines | 30 lbs. | 27% |
| Shrimp | 10 lbs. | 9% |
| Squid | 10 lbs. | 9% |
| Clams | 10 lbs. | 9% |

This gives an initial batch weight of 110 lbs. Before adding each ingredient to the batch, the fish are cleaned, so that only clean flesh is used. Such a batch initially weighs 110 lbs. Each of the constituents is finely chopped and ultimately blended and substantially liquefied so that the entire batch is completely mixed in a uniform manner to provide a homogeneous mass.

The batch is then frozen and subjected to freeze-drying under a vacuum, which removes the moisture from the blend. Typically, a batch initially weighing 100 lbs. is reduced in weight 80% by the freeze-drying operation, and produces about 22 lbs. of freeze-dried natural blend. Initially, the freeze-dried material is in the form of relatively large, relatively hard pieces. It is then subjected to severe agitation on a screenlike surface which only allows passage of granules of a predetermined maxium size. This is continued until the material has been reduced to small granules having a granular size similar to sugar or sand. Because of the freeze drying of this natural blend, it becomes extermely stable and is highly concentrated so that a small amount will provide odor which will attract fish for a long period of time.

The casting or molding mixture contains the following ingredients:

1. A floating plastic or industrial soft plastic such as aliphatic polyester, one source of such plastic is Lure Craft Industries, Inc. of Salisbury, Ind., under their trade designation No. 502 or No. 536.

2. A blend of whitefish oil and madhaden fish oil (preferably in equal parts) one source of such fish oil blend is Warner J. Smith Company of Cleveland, Ohio.
3. A non-toxic phosphorescent material such as a zinc sulfite copper doped compound. One such material can be obtained from Hanovia Chemical Company of Newark, N.J., under their trade designation P-1000.
4. A blend of extracts including 100% pure anise and other extracts as desired. Such extracts can be obtained from Unger Company of Lincoln Park, N.J.

If colored bait is desired, a phosphorescent color base of appropriate color, obtainable from Lure Craft Industries, Inc., of Solsberry, Ind., is mixed with the plastic material before heating. The proportions of the various ingredients can be varied to some extent; however, the following three examples of batch proportions are recommended:

EXAMPLE 1

16 oz. plastic No. 102 or No. 536
2 oz. fish oil blend
1 Tablespoon of P-1000 fluorescent
1 Tablespoon granular freeze-dried natural blend
174 Teaspoon blend anise/Licenerce
Phosphorescent color base as required to produce the desired color.

EXAMPLE 2

16 oz. plastic No. 502 or No. 536
3 oz. fish oil blend
2 Tablespoons P-1000
2 Tablespoons granular freeze-dried natural blend
¼ Teaspoon blend anise/Licenerce
Phosphorescent color base as required to produce the desired color.

EXAMPLE 3

16 oz. plastic No. 502 or No. 536
4 oz. fish oil blend
3 Tablespoons P-1000
3 Tablespoons granular freeze-dried natural blend
¼ Teaspoon blend anise/Licenerce
Phosphorescent color base as required to produce the desired color.

In each Example, the batch is prepared as follows. If coloring is desired, the phosphorescent color base is mixed with the plastic while cool in the liquid state. The plastic and coloring, if used, is heated while stirring. As the heating occurs, the plastic starts to gel, and subsequently at higher temperatures starts to liquefy. When the plastic is gelled and then liquefied, the remaining ingredients, which have already been mixed together, are added to the plastic. Typically, this starts the plastic to gel slightly again. Heating is continued, with stirring, until the formula is again liquefied at a temperature of approximately 350 degrees Fahrenheit. The mixture is then poured into the cavities 17 and allowed to cool, to complete the manufacture of the fish bait. The bait fish is preferably packaged in an airtight oil-impervious material so as to retain the fish oil. If the bait fish is used for a sufficient time to cause most of the fish oil to leach out and be depleted, the bait can be sprayed with additional fish oil to regenerate the fish bait.

In use, the fish bait should be subjected to a bright light, such as sunlight or bright lantern light, shortly before use to activate the phosphorescent action of the P-1000. This exposure to light causes the P-1000 to emit a soft glowing light for a period of time after such exposure. Repeated exposure may be necessary to maintain the phosphorescent quality of the fish bait.

Because the fish bait is phosphorescent and emits a soft glow, it can be used day or night, and in relatively murky waters. Further, the presence of the fish oil which leaches out of the fish bait body and of the natural blend which provides odor assures that the fish bait will attract fish. The anise and Licenerce blend is used to mask the odor of the plastic.

In the illustrated embodiment, the fish bait is in the shape of a sardine, weighs about two ounces, is about seven inches long, and has a thickness of about ½ inch and a width of about two inches. Typically, each batch as described above will produce about 13 fish bait.

Although the preferred embodiment of this invention has been shown and described, it should be understood that various modifications and rearrangements of the parts may be resorted to without departing from the scope of the invention as disclosed and claimed herein.

What is claimed is:

1. An artificial fish bait comprising a body of soft plastic in the shape of a bait fish, said plastic containing a freeze-dried granular mixture of natural blend, said plastic permitting leaching of the scent of said natural blend whereby said fish bait simulates a natural bait, said natural blend being a blend of mullet, pin fish, sardines, shrimp, squid, and clams.

2. An artificial fish bait as set forth in claim 1, wherein said natural blend initially includes by weight about:
46% mullet and/or pin fish
27% sardines
9% shrimp
9% squid
9% clams.

3. An artificial fish bait as set forth in claim 2, wherein said natural blend is freeze-dried to reduce its initial weight by about 80% and is in the form of fine granules.

4. An artificial fish bait as set forth in claim 3, wherein said plastic also contains a nontoxic phosphorescent material which emits light after exposure to light.

5. An artificial fish bait as set forth in claim 4, wherein said plastic also includes fish oil which leaches out of the fish into the water.

6. An artificial fish bait as set forth in claim 1, wherein said plastic also contains a nontoxic phosphorescent material which emits light after exposure to light.

7. An artificial fish bait as set forth in claim 6, wherein said plastic also includes fish oil which leaches out of the plastic into water.

8. An artificial fish bait as set forth in claim 1, wherein said plastic also includes fish oil which leaches out of the bait into water.

9. A method of forming an artificial fish bait comprising forming a natural blend of ingredients selected from mullet, pin fish, sardines, shrimp, squid, and clams, freeze-drying said natural blend, forming said freeze-dried natural blend into fine granules and mixing said fine granules of natural blend along with a phosphorescent material and fish oil in a moldable soft plastic, and casting the mixture to the shape of a natural bait fish.

* * * * *